United States Patent [19]

Kersten et al.

[11] Patent Number: 4,941,320

[45] Date of Patent: Jul. 17, 1990

[54] INDUSTRIAL HYDRAULIC DOOR OPERATOR

[75] Inventors: Otto E. Kersten, Milwaukee; Jack E. Moll, New Berlin, both of Wis.; George C. Balbach, Lake Forest, Ill.

[73] Assignee: ASI Technologies, Inc., Milwaukee, Wis.

[21] Appl. No.: 208,938

[22] Filed: Jun. 17, 1988

[51] Int. Cl.[5] .................... E06B 9/204; E06B 9/209; F16D 1/02

[52] U.S. Cl. .................... 60/437; 60/436; 60/441; 60/442; 60/464; 74/625; 74/665 E; 160/310; 160/311; 160/312; 49/27; 49/360; 417/442

[58] Field of Search .................... 49/27, 360, 199; 74/625, 665 E; 192/67 P; 60/406, 436, 437, 441, 442, 401, 464; 160/311, 312, 310; 417/442

[56] References Cited

U.S. PATENT DOCUMENTS

| | | | |
|---|---|---|---|
| 2,096,251 | 10/1937 | Knight et al. | 74/625 |
| 2,110,231 | 3/1938 | McCloud | 74/625 X |
| 2,622,452 | 12/1952 | Michelman | 74/625 |
| 2,670,065 | 2/1954 | Stevens | 74/625 X |
| 2,758,836 | 8/1956 | Purdy | 49/27 X |
| 3,001,038 | 9/1961 | Gessell | 49/27 X |
| 3,383,948 | 5/1968 | Palmer et al. | 74/625 |
| 3,992,991 | 11/1976 | Koch | 74/625 X |
| 4,296,570 | 10/1981 | Balbach et al. | 49/360 |
| 4,474,078 | 10/1984 | Denkowski et al. | 74/625 |
| 4,519,487 | 5/1985 | Florin | 74/625 X |
| 4,694,607 | 9/1987 | Ishida et al. | 49/25 |
| 4,721,146 | 1/1988 | Wardlaw | 160/312 X |

FOREIGN PATENT DOCUMENTS

| | | | |
|---|---|---|---|
| 718635 | 2/1980 | U.S.S.R. | 60/442 |

*Primary Examiner*—Robert E. Garrett
*Assistant Examiner*—George Kapsalas
*Attorney, Agent, or Firm*—Quarles & Brady

[57] ABSTRACT

A door operator having a fluid drive motor and a manual override. The bidirectional hydraulic motor connects to a drive shaft through a power train including a shiftable —quill—type manual clutch mechanism which allows an alternate connection of the drive shaft to a manually-operated wheel. When the cable which shifts the clutch for manual drive is pulled, a switch disables the control for the hydraulic motor. When the motor is not provided with pressured fluid from the pump a hydraulic brake engages the motor.

5 Claims, 4 Drawing Sheets

FIG. 4
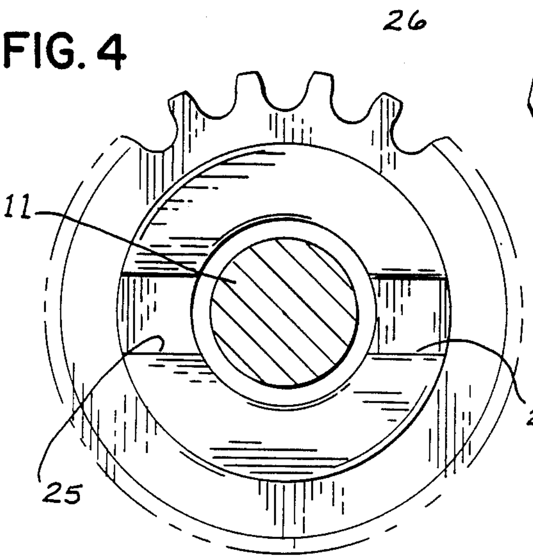
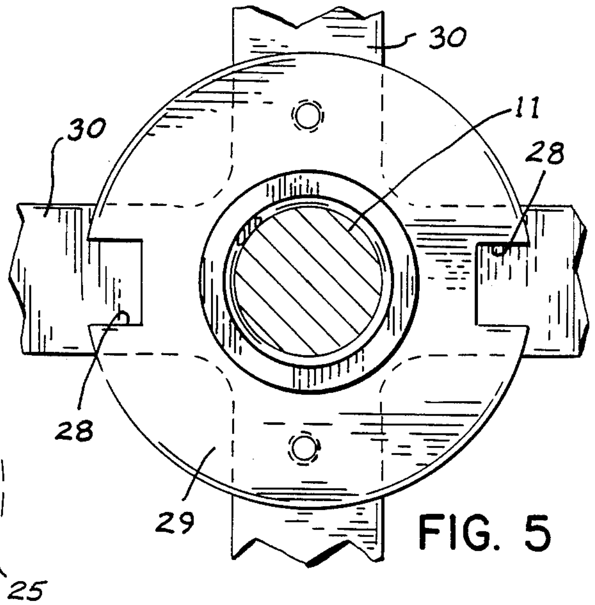
FIG. 5
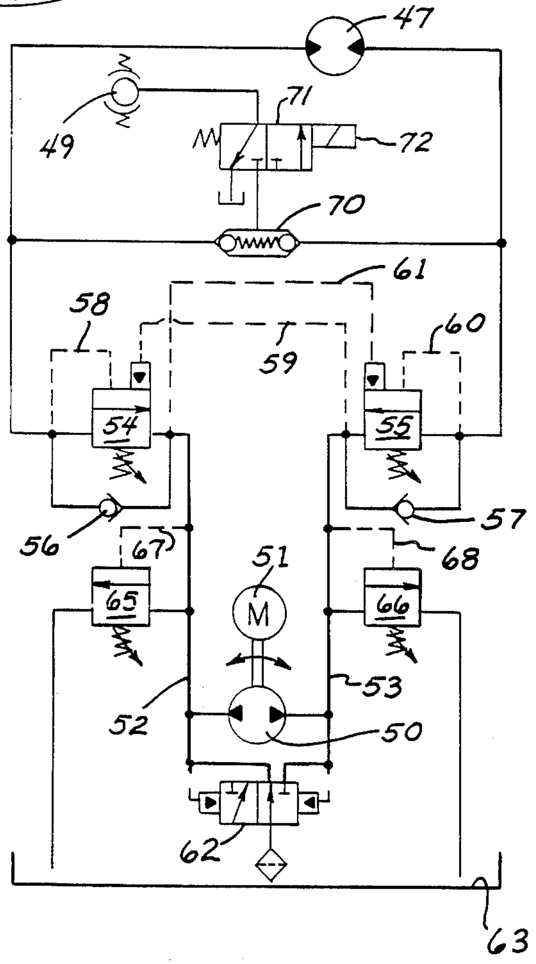
FIG. 6

INDUSTRIAL HYDRAULIC DOOR OPERATOR

BACKGROUND OF THE INVENTION

This invention relates to roll-up and other types of vertical industrial doors, and particularly to a door operator for opening and closing such doors both automatically and with manual override.

Industrial doors fall in two main categories: vertically opening and horizontally opening doors. Examples of the vertical doors are the roll-up type in which a sheet or series of slats are wound about a shaft at the top of the door opening, and the slat-type in which the door follows a vertical and then horizontal track. Examples of the horizontal doors are the slide-by type in which a door is suspended on a horizontal track and the accordion-type in which the articulated door panels are suspended from a horizontal track and are folded toward and away from the door opening.

Because industrial doors typically function to separate one environment from another, it is desirable that the doors be opened and closed rapidly, usually in response to automatic actuation. To that end, powered door operators have been developed which use either electric or hydraulic motors operating through a drive train and with suitable controls to move the door between its open and closed positions. An example of an hydraulic door operator is found in U.S. Pat. No. 4,296,570 issued Oct. 27, 1981 to Balbach, et al. and assigned to the assignee of this application.

Vertically opening doors present some requirements for control which are not present in horizontally opening doors because the weight of the door is suspended when it is partially or fully open and a loss of control could result in the door closing and causing injury to person or property. Furthermore, a vertical door cannot typically be easily manually opened in the case of a power failure or the like because of the weight of the door, whereas a horizontal door can usually be physically slid on the track.

The present invention provides an operator for an industrial door that will prevent rotation of the drive elements when there is a loss of power, but which permits manual override so that the door can be manipulated manually to open or close it.

SUMMARY OF THE INVENTION

In accordance with the invention we provide a door operator for opening and closing a vertical door, which operator includes a drive shaft connectable to the door to move the door between open and closed positions, a bidirectional hydraulic motor driven by a pump and connected by a power train to the drive shaft, an hydraulic brake connectable with the power train, and control means for controlling the direction and duration of the operation of the hydraulic motor and for engaging the brake whenever the motor is not provided with fluid under pressure from the pump.

Further in accordance with the invention, the door operator includes a shiftable quill mounted to the drive shaft and movable between one position in which the quill connects the power train to the drive shaft and a second position in which a manually operable wheel is connected to the drive shaft and the power train is disconnected.

In accordance with the preferred embodiment, the hydraulic brake is an hydraulic disc brake that engages with a rotor disposed in the power train. The brake is spring actuated to normally engage the rotor and to thereby prevent rotation of the drive shaft. The hydraulic brake is actuated to release the power train whenever the hydraulic motor is provided with fluid under pressure from the pump for either opening or closing the door. When the hydraulic motor is halted by removing pump pressure, after a short time delay the disc brake will again engage. Thus, the brake will be engaged after the hydraulic motor has completed opening or closing of the door or if power fails at any other time.

The automatic control of the door can be overridden by manually shifting the shiftable quill. The shiftable quill preferably has flanges on opposite ends each provided with dogs that can alternately engage slots in the face of a power train drive sprocket journaled on the drive shaft or in the face of the manually rotatable wheel. When engaged with the wheel, the shiftable quill disconnects the power train from the drive shaft and allows a human operator to rotate the wheel and move the door either up or down.

It is a principal object of the invention to provide an hydraulic door operator that will automatically hold the drive elements against rotation when power is not applied to the hydraulic motor.

It is another object of the invention to provide such an hydraulic door operator which can be readily manually overridden to allow a human operator to open and close the door.

The foregoing and other objects and advantages of the invention will appear in the detailed description that follows. In the description reference is made to the accompanying drawings which illustrate a preferred embodiment of the invention.

BRIEF DESCRIPTION OF THE DRAWINGS

FIG. 4 is an enlarged view of a drive sprocket taken from the plane of the line 4—4 of FIG. 1;

FIG. 5 is an enlarged view of a portion of the manually operable wheel and taken from the plane of the line 5—5 of FIG. 1;

FIG. 6 is a schematic view of the hydraulic system for controlling the hydraulic motor and brake.

DETAILED DESCRIPTION OF THE PREFERRED EMBODIMENT

Figure 1:
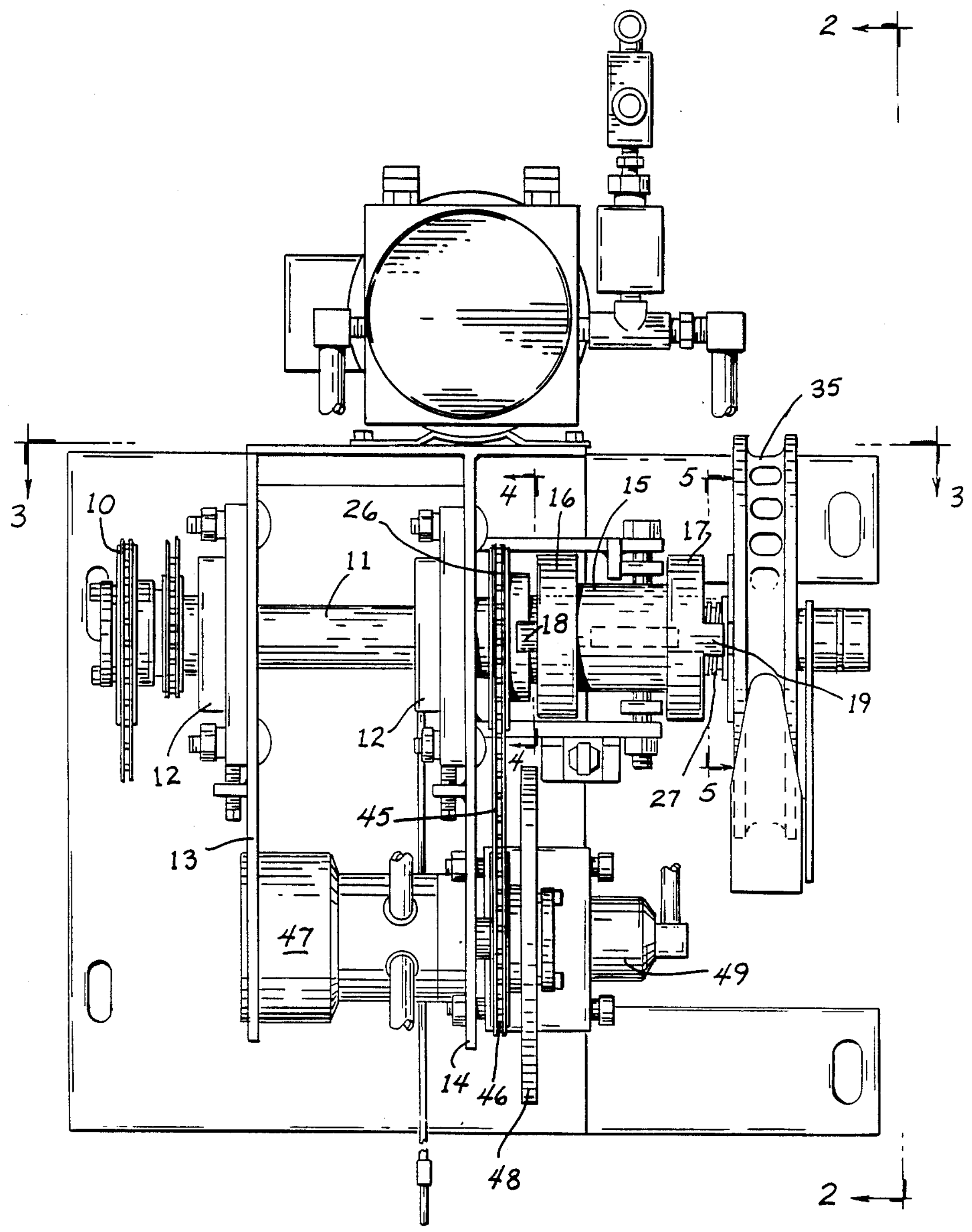
FIG. 1 is a side view in elevation of a door operator in accordance with the present invention.
Figure 2:
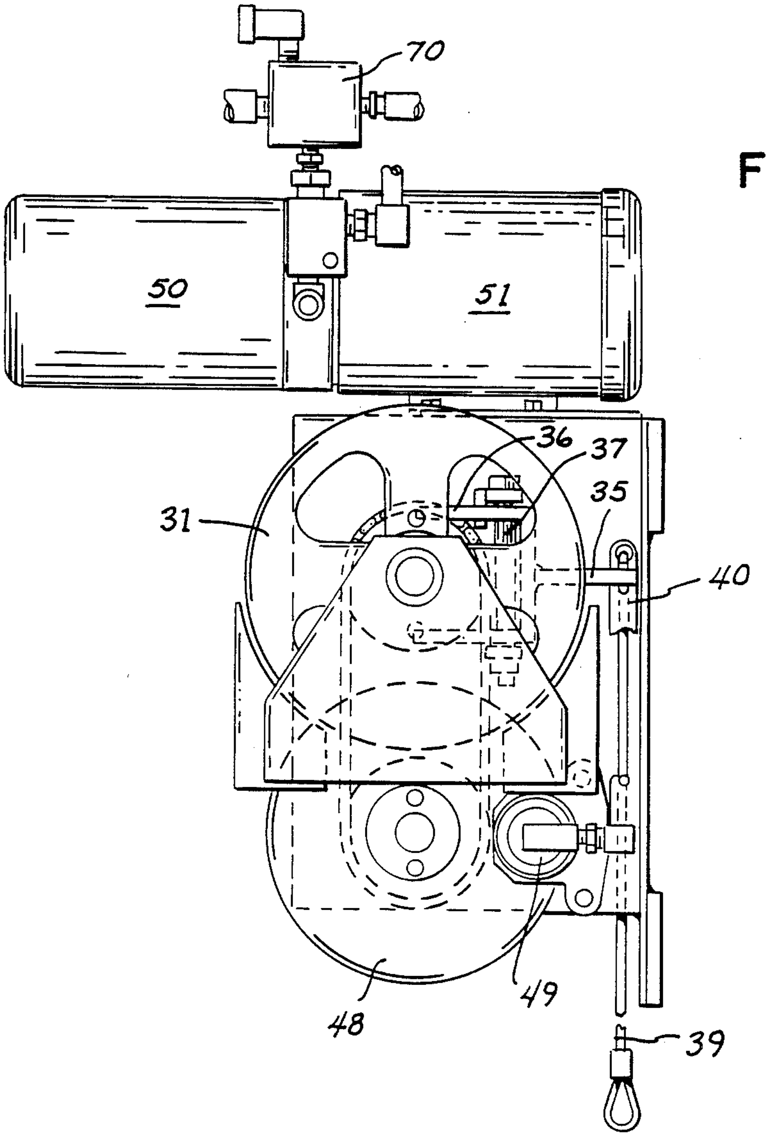
FIG. 2 is an end view in elevation of the operator of FIG. 1 taken in the plane of the line 2—2 of FIG. 1 and to a reduced scale.

Referring to FIG. 1, the door operator functions to control the direction of rotation and the starting and stopping of an output sprocket 10 which is mounted to a drive shaft 11 journaled in bearings 12 mounted in spaced support plates 13 and 14. The output sprocket 10 is connected by a chain or other transmission device to the shaft upon which a roll-up door is mounted or is connected to a hoist for the vertical door, in a manner known in the art. The drive shaft 11 mounts a shiftable disconnect quill 15 which is keyed to the drive shaft 11 and movable axially thereupon. The disconnect quill 15 has flanges 16 and 17 at opposite ends, and the flanges each has a pair of axially projecting dogs 18 and 19, respectively, that are disposed 180° apart on the end surface of the flanges 16 and 17.

In one position of the disconnect quill 15, the dogs 18 on the left flange 16 engage with a pair of slots 25 in the face of a driven sprocket 26 that is journaled on the drive shaft 11 (see FIG. 4). The disconnect quill 15 is urged to engage with the drive sprocket 26 by a compression spring 27. The disconnect quill 15 can be shifted to an opposite axial position in which the dogs 19 on the right flange 17 engage with slots 28 in a flange 29 connected to the spokes 30 of a pocket wheel 31. The pocket wheel 31 is journaled on an end of the drive shaft 11 and is adapted to receive a chain (not shown) which can be grasped by a human operator to rotate the pocket wheel 31. Thus, depending upon the position of the disconnect quill 15, the drive shaft 11 can be rotated either manually through rotation of the pocket wheel 31 or under power through the driven, sprocket 26.

Figure 3:
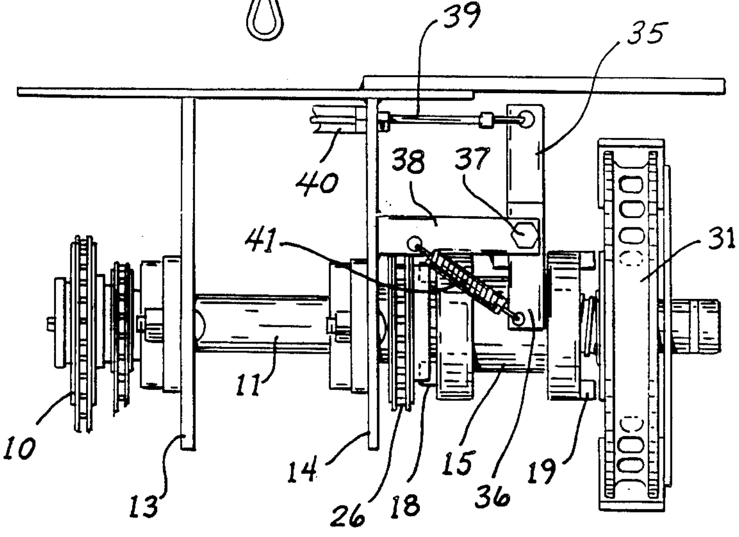
FIG. 3 is a plan view of the door operator taken in the plane of the line 3—3 of FIG. 1.

The disconnect quill 15 is shifted between its two positions by a disconnect fork 35 having a pair of spaced arms 36 that extend on opposite sides of the disconnect quill 15 for engagement with the inner face of the right flange 17. The fork 35 is mounted on pivots 37 held in brackets 38 extending from the support plate 14. The single end of the fork 35 is connected to one end of a disconnect cable 39 which extends over a sleeve 40 and downwardly to a position where it can be grasped by a human operator. As shown in FIG. 3, the arms 36 of the fork 35 are normally urged by a tension spring 41 to a position out of engagement with the right flange 17.

The driven sprocket 26 is part of a power train that includes a chain 45 leading to a drive sprocket 46 mounted on the output shaft of a bi-directional hydraulic motor 47. Connected to the face of the drive sprocket 46 is a flat rotor 48 that is engaged by an hydraulic caliper disc brake 49. The hydraulic brake 49 is spring biased towards engagement and is powered to release engagement with the rotor 48. The brake 49 may be of the type made by MICO Inc. of North Mankato, Minn. under their Series 515 designation.

As shown schematically in FIG. 6, the hydraulic motor 47 is driven by a bi-directional hydraulic pump 50 which in turn is powered by an electric motor 51. The basic circuit for controlling the delivery of fluid under pressure from the pump 50 to the hydraulic motor 47 is similar to that shown and described in the aforementioned U.S. Pat. No. 4,296,570. Reference is made thereto for a detailed description of the operation of the basic circuit.

A pair of control lines 52 and 53 lead from opposite sides of the pump 50 to opposite ports of the hydraulic motor 47 through respective cushion stop lock valves 54 and 55, in the form of adjustable pressure relief valves. A check valve 56 and 57 is connected in parallel with the cushion stop valves 54 and 55. The cushion stop valve 54 includes a pair of pilot lines 58 and 59 connected respectively to the control line 52 on the motor side of the cushion stop valve 54 and to the opposite control line 53. The pilot line 59 senses pressure in the opposite control line 53. High pressure in the opposite control line 53 indicative that the pump 50 is supplying hydraulic fluid under pressure to the right-hand port of the motor as viewed in FIG. 6, will cause the cushion stop valve 54 to be piloted to a position where it will open the valve and allow the left-hand port of the motor 47 to drain back to the pump 50 bypassing the check valve 55.

The cushion stop valve 54 acts to insure smooth stopping of the door. This function is provided by the pilot line 58 which senses high pressure coming from the left-hand port of the motor 47. When the pump 50 stops, the hydraulic motor 47 will continue to turn for short time thereby building up pressure in the left-hand port of the motor 47. Because the pump is no longer pressurizing the opposite control line 53, the cushion stop valve 54 would normally return to a closed position. However, the high pressure produced at the left-hand port of the motor 47 will act through the pilot line 58 to maintain the cushion stop valve 54 in an open position permitting hydraulic fluid to pass through that valve back to the pump. Thus, the hydraulic motor is permitted to rotate for a short time after the pump is stopped to insure smooth stopping of the door. When the hydraulic motor 47 finally stops, the cushion stop valve 54 will close and act as an additional check valve in the system. Without the cushion stop valve 54, the check valve 57 associated with the opposite control line 53 would act to abruptly stop the hydraulic motor 47 as soon as the pump 50 would stop.

Cushion stop valve 55 functions in the same manner through pilot lines 60 and 61 except that it operates to insure a smooth stopping of the door when the pump 50 is pumping fluid in the opposite direction to drive the motor 47 in the reverse direction.

The pump 50 is provided with replacement hydraulic fluid which may be lost from the system through a piloted two-way valve 62 that leads from a sump 63. A pair of cushion start valves 65 and 66 are connected between the sump 63 and the control lines 52 and 53, respectively. The cushion start valves 65 and 66 are adjustable pressure relief valves which include pilot lines 67 and 68, respectively. If a control line pressure is greater than a predetermined value in either of the control lines 52 or 53, the associated valve 65 or 66 opens to relieve the pressure in the control line by bypassing hydraulic fluid to the sump 63 until the line pressure drops to a predetermined value. In this manner, the cushion start valves 65 and 66 are used to reduce the initial peak pressure surge that may develop in the control lines 52 and 53 when the pump 50 is started by the electric motor 51. This cushions the start up of the system by providing a more even and constant application of hydraulic pressure in the system so that the door begins to move smoothly in its opening or closing cycle. After starting, the pressures developed by the pump 50 in the lines 52 and 53 are smaller, and the valves 65 and 66 will normally close after start up so that fluid flow is confined from the pump 50 to the hydraulic motor 47 and back to the pump 50.

The hydraulic system is completed by a shuttle valve 70 connected across the control lines 52 and 53 on opposite sides of the hydraulic motor 47 and which feeds hydraulic fluid under pressure from either of those lines to a two-way valve 71. The valve 71 is spring biased to a closed position and is actuated by a solenoid 72 to an open position in which fluid is supplied under pressure through the shuttle valve 70 to the hydraulic brake 49. Thus, fluid is supplied under pressure to the two-way valve 71 whenever either the control line 52 or 53 is pressurized. However, as will appear hereafter the solenoid 72 functions on a short time delay so that the fluid pressure is blocked from releasing the brake for a short time delay to insure that the brake 49 and motor 47 do not fight each other.

Figure 7:
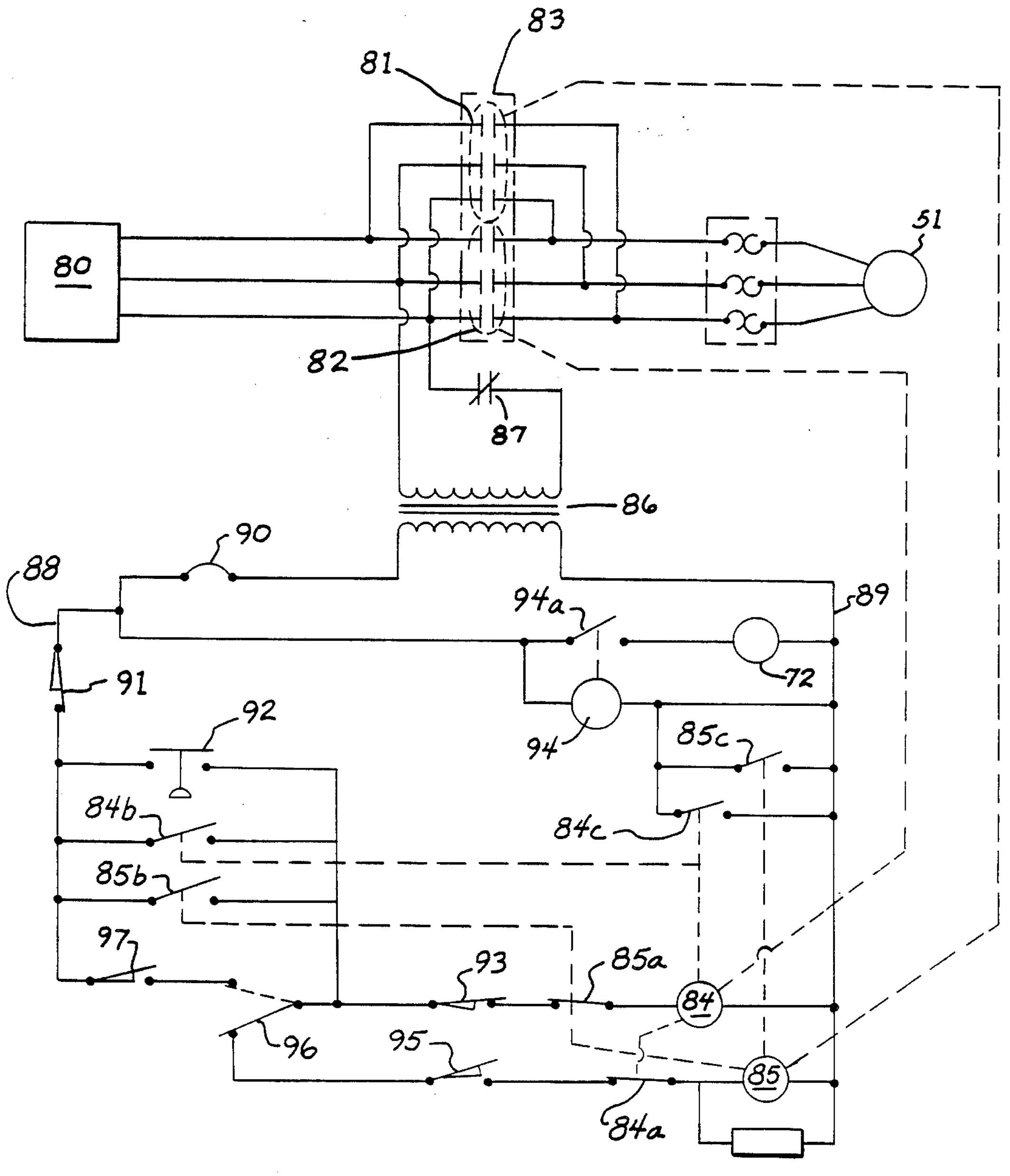
FIG. 7 is a schematic view of the electrical control system of the door operator.

The electric control circuit for the door operator is illustrated schematically in FIG. 7. Three-phase power is supplied from a power source 80 to the motor 51 through either the sets of contacts 81 or 82 of an across-the-line motor starting switch 83. The motor starting switch is of the double coil reversing type, with a door opening coil 84 that closes the contacts 82 when energized and a door closing coil 85 that closes the contacts 81 when energized. The motor starting switch 83 is operated by a control circuit that is fed by a voltage step-down transformer 86 having a motor overload relay 87 on its primary side. The step down control voltage from the transformer 86 feeds control circuit lines 88 and 89, there being a circuit breaker 90 in the line 87.

The line 87 includes a normally closed switch 91 that is opened whenever the cable has been pulled to initiate manual operation of the door. Thus, the control circuit will be operable so long as the door operator is not in the manual mode. Closing a manual push button switch 92 or other actuator will provide energy to the open coil 84 so long as the close coil 85 is not energized and normally closed contacts **85*a* have not thereby been opened, and so long as a normally closed up limit switch 93 has not been actuated by the door having been moved to its rolled-up position. The energization of the open coil 84 will open relay contacts 84*a* to insure that the close coil 85 cannot simultaneously be energized, and will also close contacts 84*b* to bypass the manual switch 92 which can return to an open position. When the motor has been rotated to roll up the door, the limit switch 93 will open thereby opening the circuit to the open coil 84** and stopping the movement of the door.

So long as the open coil 84 is energized, a normally open contact **84*c* will be closed to complete a circuit to a time delay relay coil 94 thereby closing the contact 94*a* and energizing the solenoid 72 of the hydraulic brake 49. This will release the brake 49 and allow the output sprocket 10 to be driven by the hydraulic motor 47. When the open coil 84 is deenergized after the door has been rolled up, the circuit to the time delay relay 94 is opened and after the predetermined time delay, such as one second, the contact 94*a* is opened and the solenoid 72 deenergized to allow the brake 49 to return to its normal engaged position where it holds the output sprocket 10** from accidental rotation, except under manual control.

The energization of the close coil 85 is similar except the completion of a circuit to the close coil 85 requires that a limit switch 95 be closed indicating that the door is not in the down position and a door edge switch 96 associated with the edge of the door must be in a position indicating that the door is not encountering any obstruction. That is the position for the edge switch 96 shown in FIG. 7. Energization of the close coil 85 completes a holding circuit through the coil contacts **85*b* and a circuit to energize the time delay relay 94 for control of the brake 49 through the contacts 85*c***.

Should the door encounter an obstruction as it attempts to move to a closed position, the edge switch 96 will switch to its alternate position in which a circuit can be immediately completed to the open coil 84 through a limit switch 97 which is normally closed but is opened whenever the door is in its downmost position.

The limit switches 93, 95 and 97 can be controlled from an actuator shaft driven by a timing sprocket 98 mounted on the drive shaft 11.

As will be seen from the above description, the brake 49 will be engaged to prevent accidental movement of the door whenever the door has been moved fully open or fully closed. The brake 49 will also be engaged whenever there is a loss of pressure in the hydraulic system so that the door cannot accidentally close.

The door operator also provides a very convenient and easily operated manual override to allow movement of the door to any position. Once the door has been moved manually, the disconnect quill 15 can be allowed to reengage with the power train through the driven sprocket 26 and the brake will then be functional to insure that the door is held in the selected position.

We claim:

1. A door operator for opening and closing a door, comprising:
- a drive shaft connectable to the door to move the door between open and closed positions;
- a bi-directional hydraulic motor driven by a pump and connectable by a power train to the drive shaft;
- an hydraulic brake connectable with the power train;
- control means for controlling the direction and duration of operation of the hydraulic motor and for engaging the brake whenever the motor is not provided with fluid under pressure from the pump;
- a shiftable quill for connecting the power train to the drive shaft;
- a manually operable wheel alternatively connectable to the drive shaft by the shiftable quill;
- shift means for manually moving the shiftable quill between a position in which the power train is connected to the drive shaft and an alternate position in which the wheel is connected to the drive shaft, the shift means comprising a shifting fork that is engageable with the quill upon pulling of a cable connected to the fork, said fork being spring biased to a normal position out of engagement with the quill; and
- a switch actuated by the cable to disable the control means whenever the cable is pulled.

2. A door operator for opening and closing a door, comprising:
- a drive shaft connectable to the door to move the door between open and closed positions;
- a bi-directional hydraulic motor driven by a pump and connectable by a power train to the drive shaft;
- an hydraulic brake connectable with the power train; and
- control means for controlling the direction and duration of operation of the hydraulic motor and for engaging the brake following a time delay whenever the motor is not provided with fluid under pressure from the pump.

3. A door operator in accordance with claim 2 wherein the hydraulic brake is spring-actuated to engage the drive train and is released from engagement when the hydraulic motor is provided with fluid under pressure from the pump.

4. A door operator in accordance with claim 3 wherein the brake is a caliper disc brake that engages with a rotor in the power train, and the control means includes a solenoid operated valve to provide fluid pressure to the brake for release of the rotor.

5. A door operator in accordance with the claim 4 wherein the pump is driven by an electric motor and the solenoid operated valve is energized whenever the motor is energized.

* * * * *